(12) United States Patent
Dunne

(10) Patent No.: US 10,990,642 B2
(45) Date of Patent: Apr. 27, 2021

(54) METHODS AND SYSTEMS FOR SECURELY EMBEDDING DASHBOARDS INTO A CONTENT MANAGEMENT SYSTEM

(71) Applicant: AON GLOBAL OPERATIONS SE, SINGAPORE BRANCH, Singapore (SG)

(72) Inventor: Anthony Dunne, Dublin (IE)

(73) Assignee: AON GLOBAL OPERATIONS SE, SINGAPORE BRANCH, Singapore (SG)

( * ) Notice: Subject to any disclaimer, the term of this patent is extended or adjusted under 35 U.S.C. 154(b) by 198 days.

(21) Appl. No.: 15/850,517

(22) Filed: Dec. 21, 2017

(65) Prior Publication Data
US 2018/0173715 A1  Jun. 21, 2018

Related U.S. Application Data

(60) Provisional application No. 62/437,552, filed on Dec. 21, 2016.

(51) Int. Cl.
*G06F 21/10* (2013.01)
*G06F 16/958* (2019.01)
(Continued)

(52) U.S. Cl.
CPC .............. *G06F 16/958* (2019.01); *G06F 8/38* (2013.01); *G06F 21/41* (2013.01);
(Continued)

(58) Field of Classification Search
None
See application file for complete search history.

(56) References Cited

U.S. PATENT DOCUMENTS 6,938,077 B2  8/2005 Sanders
7,350,191 B1 * 3/2008 Kompella ........... G06F 9/44526
717/108
(Continued)

FOREIGN PATENT DOCUMENTS

CN  110651252  1/2020
CN  110692070  1/2020
(Continued)

OTHER PUBLICATIONS

International Search Report and Written Opinion issued in International Application No. PCT/SG2017/050636 dated Mar. 6, 2018.
(Continued)

*Primary Examiner* — Nasser M Goodarzi
*Assistant Examiner* — Terrika Peterson
(74) *Attorney, Agent, or Firm* — Gardella Grace P.A.

(57) ABSTRACT

In an illustrative embodiment, systems and methods for secure access to dynamic analytics content include receiving a request for analytics information from a user at a computing device, confirming the user's access rights, embedding access credentials within a resource link for accessing the visualization content, and supplying the resource link to the user's computing device for use in obtaining the analytics information, where, upon the computing device following the resource link, the access credentials are confirmed and visualization content is provided to the user.

15 Claims, 8 Drawing Sheets

(51) Int. Cl.
- *G06F 8/38* (2018.01)
- *H04L 29/08* (2006.01)
- *H04L 29/06* (2006.01)
- *G06F 21/62* (2013.01)
- *G06F 21/41* (2013.01)
- *H04L 9/32* (2006.01)

(52) U.S. Cl.
CPC ...... *G06F 21/6218* (2013.01); *H04L 63/0807* (2013.01); *H04L 67/02* (2013.01)

(56) References Cited

U.S. PATENT DOCUMENTS

| | | | |
|---|---|---|---|
| 8,136,109 | B1 | 3/2012 | Birdeau et al. |
| 9,122,650 | B1 | 9/2015 | Colton et al. |
| 10,037,352 | B1 | 7/2018 | Dyer et al. |
| 10,205,678 | B2 | 2/2019 | Dimitropoulos |
| 2003/0088716 | A1 | 5/2003 | Sanders |
| 2006/0080546 | A1 | 4/2006 | Brannon et al. |
| 2009/0046846 | A1 | 2/2009 | Lew et al. |
| 2009/0235349 | A1* | 9/2009 | Lai .................. H04L 9/3213 726/14 |
| 2009/0328177 | A1* | 12/2009 | Frey .................. H04L 9/3213 726/9 |
| 2010/0024014 | A1* | 1/2010 | Kailash .............. H04L 9/3213 726/6 |
| 2011/0223574 | A1 | 9/2011 | Crawford et al. |
| 2013/0036178 | A1 | 2/2013 | Pitt |
| 2013/0132809 | A1 | 5/2013 | Tseng et al. |
| 2013/0179199 | A1* | 7/2013 | Ziskind .............. G06F 21/10 705/5 |
| 2014/0026194 | A1 | 1/2014 | Smith |
| 2014/0068737 | A1 | 3/2014 | Micucci et al. |
| 2014/0129457 | A1 | 5/2014 | Peeler |
| 2015/0178861 | A1 | 6/2015 | Gordon et al. |
| 2015/0278171 | A1 | 10/2015 | Lefebvre et al. |
| 2015/0370872 | A1* | 12/2015 | Raghavan ............. G06F 16/26 726/5 |
| 2016/0065555 | A1 | 3/2016 | Branden et al. |
| 2016/0277999 | A1 | 9/2016 | Graves et al. |
| 2016/0314605 | A1* | 10/2016 | Filippi .............. G06F 16/9038 |
| 2016/0349932 | A1 | 12/2016 | Gorny |
| 2017/0041296 | A1 | 2/2017 | Ford et al. |
| 2017/0279706 | A1 | 9/2017 | Chen |
| 2017/0329993 | A1 | 11/2017 | Yao et al. |
| 2017/0346758 | A1 | 11/2017 | Dimitropoulos |
| 2017/0352073 | A1 | 12/2017 | Musti et al. |
| 2018/0060283 | A1 | 3/2018 | King et al. |
| 2018/0173390 | A1 | 6/2018 | Dunne et al. |
| 2018/0173748 | A1 | 6/2018 | Rasdale et al. |
| 2018/0322571 | A1 | 11/2018 | Vea et al. |

FOREIGN PATENT DOCUMENTS

| | | |
|---|---|---|
| EP | 2357558 | 8/2011 |
| EP | 3559830 | 10/2019 |
| EP | 3559879 | 10/2019 |
| WO | 2013054196 | 4/2013 |
| WO | 2013082654 | 6/2013 |
| WO | 2017107367 | 6/2017 |
| WO | 2018117967 | 6/2018 |
| WO | 2018117968 | 6/2018 |

OTHER PUBLICATIONS

International Preliminary Report on Patentability issued in International Application No. PCT/SG2017/050636 dated Jun. 25, 2019.
Andrew Beers, "Embedding Tableau in Your Portals, Websites and Applications", Jul. 18, 2013 (Jul. 18, 2013), https://web.archive.org/web/20130718005719if_/http://mkt.tableausoftware.com:80/downloads/embedding_views.pdf.
International Search Report and Written Opinion issued in International Application No. PCT/SG2017/050633 dated Mar. 6, 2018.
International Preliminary Report on Patentability issued in International Application No. PCT/SG2017/050633 dated Jun. 25, 2019.
Keshav R et al., "Towards a taxonomy of architecture integration strategies", 3rd International Software Architecture Workshop, Nov. 1-2, 1998.
International Search Report and Written Opinion issued in International Application No. PCT/SG2017/050634 dated Mar. 2, 2018.
International Preliminary Report on Patentability issued in International Application No. PCT/SG2017/050634 dated Jun. 25, 2019.
Melnick, J., "How to Create New Active Directory Users with PowerShell". Jun. 2018.

* cited by examiner

METHODS AND SYSTEMS FOR SECURELY EMBEDDING DASHBOARDS INTO A CONTENT MANAGEMENT SYSTEM

RELATED APPLICATIONS

This application claims priority to U.S. Provisional Patent Application Ser. No. 62/437,552, entitled "Methods and Systems for Securely Embedding Dashboards into a Content Management System," filed Dec. 21, 2016. This application is related to U.S. patent application Ser. No. 15/846,496 entitled "Content Management System Extensions," filed Dec. 19, 2017. All above identified applications are hereby incorporated by reference in their entireties.

BACKGROUND

Frequently, content management platforms will provide integration tools for seamlessly integrating with popular third-party applications. However, where the content management platform has not provided these customized hooks, the information technology team managing the content management platform for an organization must solve integration problems through generic integration devices included within the content management platform, such as raw application programming interfaces (APIs) and controls. Often, the examples provided for such integration assume open integration with publicly available tools or data sources, leaving security concerns such as platform exploitation by third parties and potential access to confidential or sensitive data unaddressed.

Out of the box, for example, some popular CMS solutions are capable of integration with key popular software tools, leaving all other API solutions to developers to solve through a handful of options, such as an open API such as a REST API, an integration bus, and/or by combining custom application code with the CMS application code and calling raw APIs and controls from within the CMS. Further, should the CMS sever its relationship with the popular software tool, the end user may be left scrambling to select from the handful of options available to maintain the platform going forward.

Some third-party software tools do the integration work for the end customer with popular CMS platforms, for example by developing a framework for integrating third party applications into its CMS. However, dependency upon a third-party solution linking the CMS to a limited software tool set lacks flexibility and provides a piecemeal solution, where different third-party applications must "join in" to generate a fulsome solution. Further, reliance on third party solutions involves reliance on third party security mechanisms, losing direct control of security measures.

The inventors recognized a need to create a solution to establish trusted authentication and seamless integration between an organization's content management system and third-party applications. The solution required control over security mechanisms to ensure data integrity and system robustness.

SUMMARY OF ILLUSTRATIVE EMBODIMENTS

The forgoing general description of the illustrative implementations and the following detailed description thereof are merely exemplary aspects of the teachings of this disclosure, and are not restrictive.

The inventors designed methods and systems to establish trusted authentication and seamless integration between an organization's content management system (CMS) and third-party applications by nesting the content management system within a core portal application. The CMS, for example, may include an API interface, accepting customized web parts, modules, providers, event handlers, and other extensions. To use the CMS, a developer may customize page templates and enhance the page templates with controls and web parts, allowing for the display and even modification of data derived from external systems, such as an analytics data store.

In some embodiments, the solution is designed to host static content such as text or static media (e.g., images, videos) as well as high impact content such as dynamic interactive dashboard interfaces within a data analytics ecosystem. Particularly, the solution may support self-service deployment of high impact content such as Single Page Applications (SPAs) and dynamic interactive analytics workbooks to the CMS. Prior to development of the integration solutions, for example, analytics workbooks developed using an analytics development platform required information technology (IT) staff intervention for release into the CMS.

In some embodiments, the solution supports establishing a trusted authentication with a high impact content development tool (data analytics development system) such as Tableau by Tableau Software of Seattle, Wash. or JasperSoft by TIBCO Software of San Francisco, Calif. in a way that provides seamless delivery of dynamic interactive visualizations (e.g., dashboards) to end users and seamless interactions (e.g., database queries) between the data analytics development system and an end system. The creation, management and/or rendering of a dynamic interactive visualization (e.g., dashboard) may depend in part on the user's role within the CMS.

In some embodiments, the solution allows analytics developers to rapidly change content without the need for a software platform version release.

In some embodiments, the solution supports user-level trusted authentication between the CMS and the analytics development system.

In some embodiments, the solution supports security validation at the user dashboard level, refining the dynamic interactive content delivered to the end user as appropriate.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
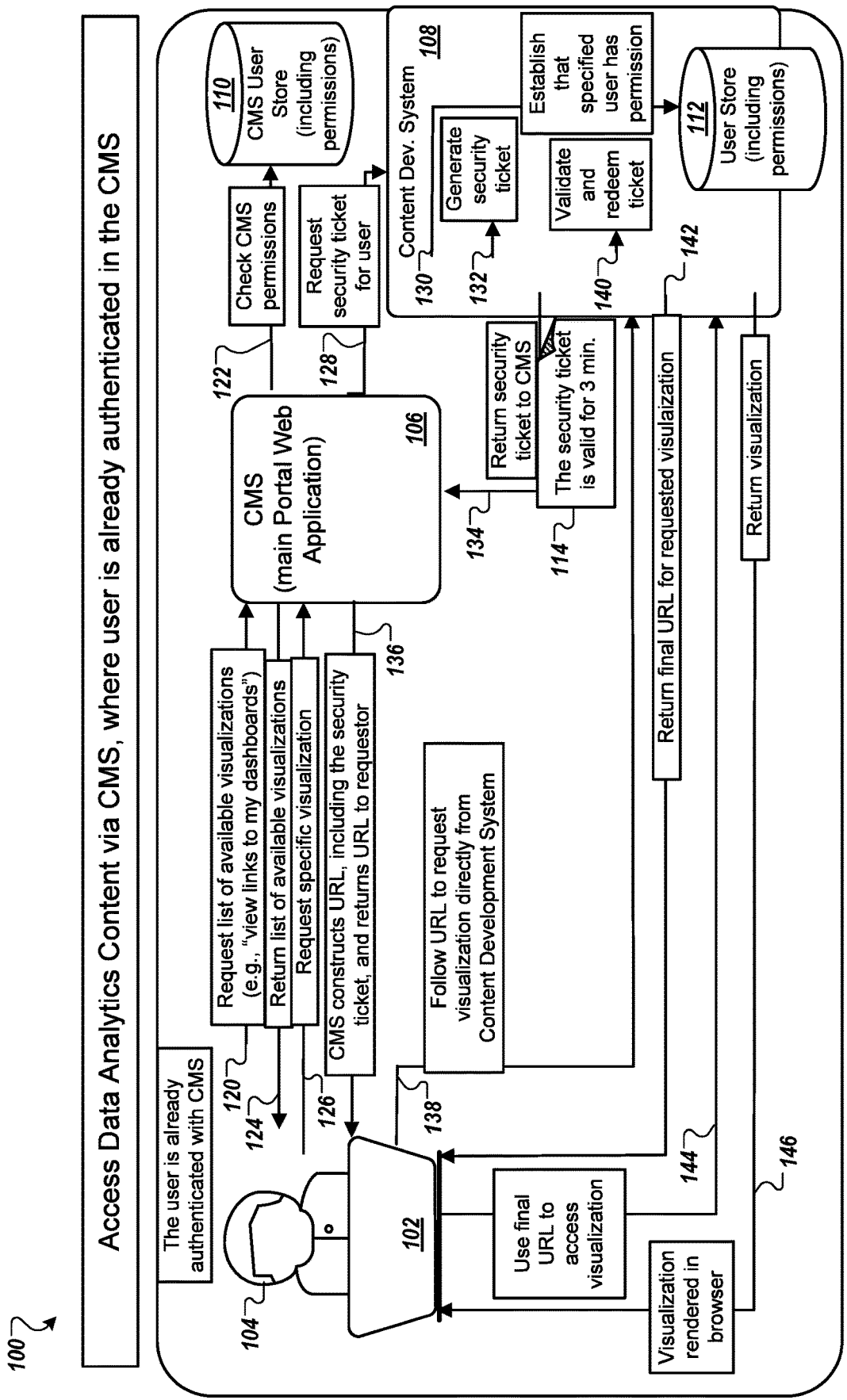
FIG. 1A is a flow diagram of an example operational flow for enabling a user to receive interactive content via a content management system with securely embedded dashboards.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

A flow diagram illustrating a method of communication within a system nesting a content management platform within a core portal application is illustrated in FIG. 1A. The operational flow 100 diagrammed in FIG. 1A, for example, walks the reader through behind-the-scenes operations triggered by a user 104 accessing a graphical user interface dashboard via a computing device 102 (e.g., laptop computer) and requesting a specific visualization (e.g., dashboard content). For example, a web portal application installed or accessed by the computing device 102 may submit requests entered via the user 104. The operational flow 100 assumes the user 102 is already authenticated (e.g., logged into) a content management system (CMS) 106.

Turning to FIG. 1A, in some implementations, the operational flow 100 begins with a user submitting a request to the CMS 106 for a list of available visualizations (120). The request 120, for example, may be submitted in query form. The user computing device 102, for example, may request to view links to the user's dynamic interactive content dashboards as part of an initial access (e.g., post user authentication) to an analytics ecosystem. The request 120 may be triggered upon the user 104 logging into the data analytics dashboard portal.

In some implementations, the CMS 106 checks the user's CMS permissions (122). For example, the CMS 106 may access a CMS data store 110 containing user information to determine permissions for the user 104. The permissions can include user roles and other permissions.

In authenticating a user, in a general sense, the CMS 106 may authenticate the user across all trusted domains within the content management system and any third-party integrations. For example, the CMS 106 may authenticate the user with cloud-based data sources, widget providers, and other trusted CMS partner tools. In this manner, the user logs in once and has seamless access to tools which are enabled for centralized user administration under the CMS 106.

Upon authentication of the user's permissions, in some implementations, the CMS 106 returns a list of available visualizations to the user 104 (124). The available visualizations, for example, may be based upon the user information itself, or a combination of information (e.g., user organization, user role within the organization, user role within the CMS 106, user permissions established in the CMS 106, etc.). In a particular example, a particular user may be associated with a role having a membership of a number of team members, as well as permissions associated with the user's given role. Further, the basic user interface may be customized for a particular role such that portions of the interface are activated for members sharing the particular role, while other portions of the interface are deactivated. The portions of the user interface exposed and/or denied to the user's role, for example, may be selected on a module basis (e.g., enabling/disabling the visualization of individual dialogs forming a dashboard interface). In a further example, dynamic interactive applications developed for presentation within a given dashboard may be selectively enabled/disabled based upon a user's role.

In some implementations, the user 104 submits a request for a specific visualization to the CMS 106 (126). The visualization, for example, may be a dashboard interface, possibly customized for presenting information relevant to the user's role. The visualization may be rendered by a Single Page Application (SPA) or dynamic interactive analytics workbook. The user, for example, may click on a selectable control within a portal interface to request a particular dashboard visualization.

In some implementations, the CMS 106 requests a security ticket for the user 104 from a content development system 108 (128). The content development system 108, for example, may be a server-based system or cloud-hosted system for developing and deploying analytics content for dashboard interfaces. The content development system 108, for example, may interface with an analytics data store to pull real time generated content into a graphical user interface for presentation to the end user 104. The content development system 108 may provide tools for integrating data sources, calculations, metadata, and data field information with coded web parts to generate real time dynamic interactive content.

To request the security ticket from the content development system 108, the CMS 106 content retrieval mechanism may be modified to interface with the content development system 108 through representational state transfer (REST) API communications. A REST API is a web service, allowing for black box (e.g., platform/language independent) intercommunication using universal identifiers (URIs). A RESTful API decouples communication interactions (e.g., no conversational state) by operating in a stateless set of predefined operations, allowing for greater scalability. The predefined operations, such as GET, POST, PUT, and DELETE, allow requesting systems to access and manipulate textual representations of web resources.

In particular, the REST API communications may be implemented using Hypertext Application Language (HAL) endpoints, allowing the CMS 1-6 and content development system 108 to communicate through two hypermedia types: Extensible Markup Language (XML) and JavaScript Object Notation (JSON). The HAL communication types are useful in representing the arbitrary data sources used in web services.

To request the security ticket, the CMS 106 content load event may be manipulated (e.g., extended) with a custom component designed to record authentication metadata and pass the authentication metadata to the content development system 108. For example, the CMS page load event may be customized to create a custom template page with embedded APIs to communicate with the content development system 108. This allows the custom template page to PUT or POST the authentication metadata (e.g., supplied by user authentication performed by the CMS 106 prior to the beginning of this method) to a HAL endpoint of a REST API interface of the content development system 108.

In some implementations, the content development system 108 receives the authentication metadata through the REST API communication and establishes that the specified user has permission to access the requested content (130). The content development system 108, for example, may access a content development system data store 112 containing user information, including permissions, to determine permissions for the user 104. As with the CMS permissions, the authentication metadata may identify a particular role and/or permissions associated with the particular user 104. The permissions in the content development system 108, for example, may mirror permissions established in the CMS 106.

Because user credentials have already been challenged and validated by the CMS 106, the request for security ticket from the CMS 106 should be adequate for authentication of the user 104 within the content development system 108, allowing the method to bypass authenticating user information on the content development system level as well. The content development system 108, for example, may not have awareness that the user 104 is logged into the data analytics ecosystem.

Upon validating user permissions, in some implementations, the content development system 108 generates a security ticket 114 (132). The security ticket 114, in some embodiments, is valid for a limited amount of time. For example, the security ticket 114 may be valid for 3 minutes from time of generation. The limited validity of the security ticket 114 provides a security mechanism to avoid unauthorized access, for example by an external API interface reusing previously generated security tickets.

In some implementations, the content development system 108 returns the security ticket 114 to the CMS 106 (134). The security ticket 114, for example, may be a resource maintained by the content development system 108 and linked via a URI passed back to the CMS 106. The security ticket 114, for example, may identify the particular user request for content (126). HAL endpoints, for example, are capable of passing arrays of information within a single URI such that a security ticket identifier, user identifier, and/or additional information (e.g., timestamp, user permissions, etc.) may be communicated via a single URI. The content development system 108, in a particular illustration, may PUSH the security ticket 114 to the CMS 106 via a HAL endpoint provided by the custom template page.

Upon receipt of the security ticket 114, in some embodiments, the CMS 106 constructs a content access link, including the security ticket 114, and returns the content access link to the user's computing device 102 (136). For example, the custom template page may include functionality to interface with a custom web part designed to convert the provided security ticket 114 into a content access link capable of communicating directly with the content development system 108 to obtain the requested dashboard interface. The content access link, for example, may be a universal resource locator (URL) for accessing web-based content, for example within a browser-based dashboard interface.

In some implementations, the user's computing device 102 follows the access link to request the visualization directly from the content development system 108 (138). For example, the user's computing device 102 may load the URL with the embedded security ticket 114 when the URL becomes available to the user interface (e.g., browser-based dashboard). The client platform interface, for example, may be designed to automatically load the content access link provided in response to the request for the specific visualization (described in relation to step 126).

The content development system 108, in some embodiments, validates and redeems the security ticket 114 embedded in the access link (140). The content development system 108, for example, may parse the security ticket 114 from a URL and determine that the security ticket information matches security ticket information maintained by the content development system 108. Responsive to validating and the security ticket 114, the content development system 108 may further verify that the security ticket 114 is still valid (e.g., has not timed out). In another example, the content development system 108 may automatically remove timed out security ticket information, such that the content development system 108 will fail to match the security ticket information if the security ticket 114 expired.

In some implementations, responsive to validating the security ticket 114, the content development system 108 returns a final access link for the requested visualization (142). The final access link, for example, may be a URL for retrieving and displaying dynamic interactive content provided by the content development system 108. The URL may generate a complete interface (e.g., browser page) or a portion of a dashboard interface (e.g., a content pane integrated with additional content supplied by the content management system without contribution from the content development system).

In some implementations, the user's computing device 102 uses the final access link to access the requested visualization (144). For example, the user's dashboard interface may automatically open the delivered access link to access content provided by the content development system 108.

In some implementations, the content development system 108 returns the visualization to the user's computing device 102 and the visualization is rendered on a display interface of the user's computing device 102 (146). The visualization, in one example, is rendered within a browser-based dashboard system. The visualization, for example, may include web-renderable code such as, in some examples, hypertext markup language (HTML), cascading style sheets (CSS), and/or Java code.

In a particular example, the visualization may include analytics information, for example, in graphs, charts, or other data summary displays, derived through the greater data analytics ecosystem. The content development system 108, for example, may be designed to generate content in real time based upon web parts developed to cull the latest information from one or more data stores (e.g., relational databases, cubes, cloud databases, and other multidimensional data storage structures). The web parts, for example, may include a number of queries defined by analytics developers for deriving analytics information for the user dashboard. Further, the web parts may include mathematical computations and/or other data merging instructions for formatting query results (e.g., rounding, comparing, etc.). The web parts, in another example, may include custom visualization layouts (e.g., analytics developer customized graphical interfaces), custom text, and/or custom multimedia content linked to data query outcomes (e.g., ranges of outcomes, particular analysis results, etc.).

Portions of the visualization may be dynamic. For example, queries may be run on a periodic (e.g., every 10 seconds, minute, 5 minutes, etc.) basis to provide a real-time presentation of analytics results. In another example, updated analytics may be pushed to the user interface when available (e.g., when a third-party data source releases updated information, when a back-end system performs system-wide analytics updates, etc.).

Portions of the visualization may be interactive. For example, the graphs, charts, and/or other visual analytics displays may be selectable to adjust depth of information, to filter information, and/or to provide context for user understanding of the information.

At this point, the content development system 108 visualization is securely embedded within the dashboard, and the user 104 can interact with the visualization in a manner that bypasses the CMS 106 until the user 104 navigates away from the present visualization. For example, the visualization may provide real time data updates, data filtering, and other user interface interaction while maintaining direct communication between the user's computing device 102 and the content development system 108.

Steps 128 through 144 may not be visible to the end user. For example, the dashboard interface executing upon the user's computing device 102 may automatically load URLs pushed from both the CMS 106 (step 136) and the content development system 108 (step 142). From the user's perspective, the request would behave like a typical request for information via a dashboard interface or other dynamic interactive content visualization system. The entire operational flow 100, for example, would be performed rapidly, such that the end user 104 recognizes nothing but a typical page load action.

Figure 1B:
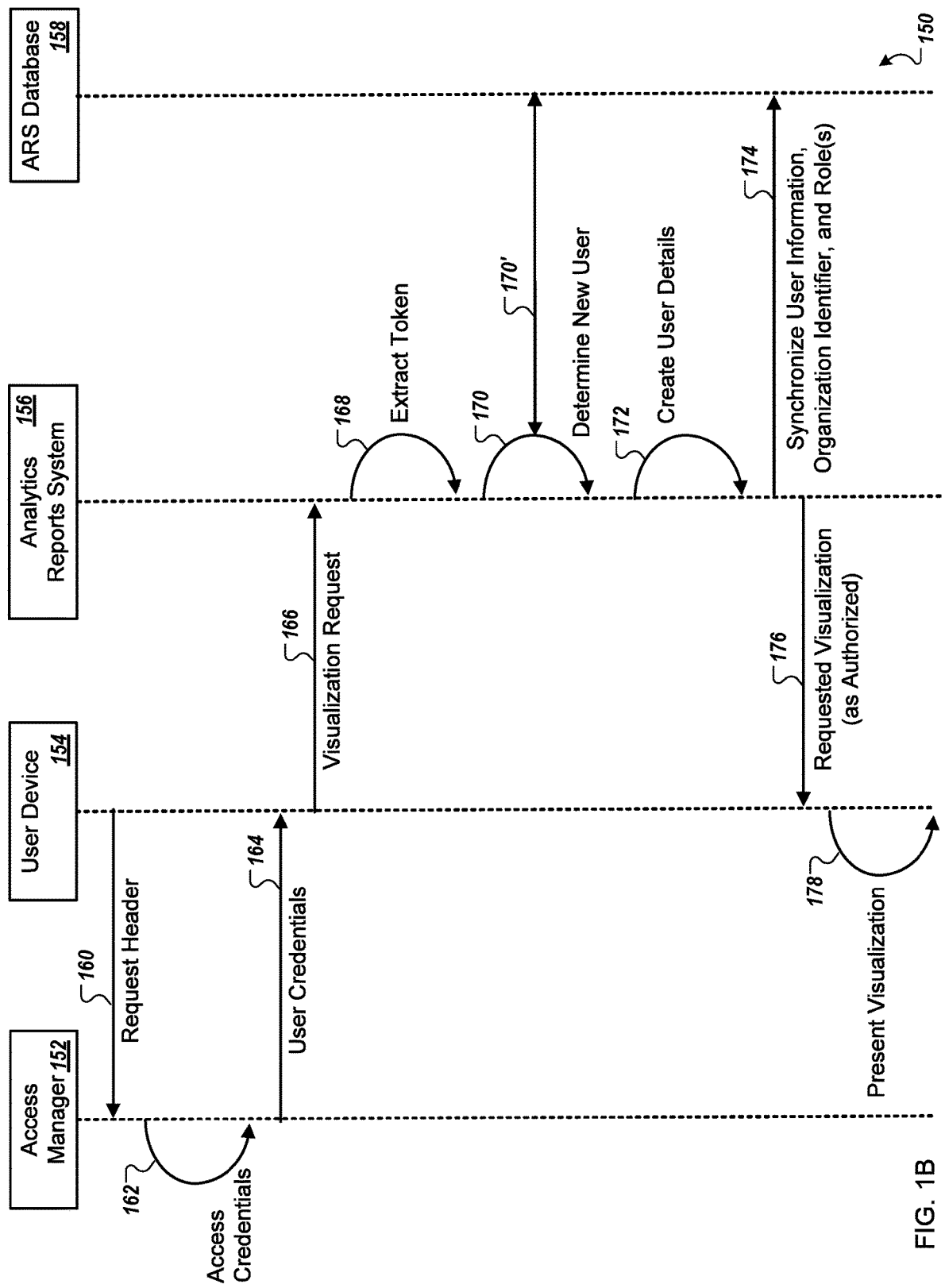
FIG. 1B is a swim diagram of an example process for enabling a user to receive interactive content via an analytics reports system with securely embedded dashboards.

FIG. 1B illustrates a swim diagram of an example process 150 for enabling a user at a computing device 154 to receive interactive content via an analytics reports system 156 with securely embedded dashboards The analytics reports system 156, for example, may be designed using the JasperReports® Server by TIBCO™ Software of Palo Alto, Calif. or the Telerik Report Server by Telerik of Bedford, Mass. The computing device 154 may communicate with the analytics reports system 156 via a web portal application or other remote interface software application.

Turning to FIG. 1B, in some implementations, the process 150 begins with the user device 154 requesting (160) a user access header from an access manager 152. The request, for example, may include login information such as a username and passcode. In some embodiments, internal users to a system, recognized by a signature of their computing systems as being connected to an intranet campus network, or other private networking environment, can be provided with automated secure single sign-on (SSO). Initially, the internal user would log in locally at the computing device. Subsequently, based upon recognition of a login by a validated user at the computing device in the private network environment, automated SSO may be supported using a signature of the computing device being used by the user. For example, as long as an internal user logs into a first system, access to subsequent systems may be established via the computing device signature without need for supplying username and password credentials. For example, the request header, in this circumstance may include the computing device signature such as the IP address of the accessing computing system.

In some implementations, the access manager 152 receives the request and accesses (162) user credentials. The access manager 152, for example, may be designed for supporting single sign-on through storing and provider header information including user name, a list of one or more email addresses, and an organization associated with each user. The access credentials, for example, may be stored in a secure storage region accessible to the access manager 152. The access manager 152 may match the login information and/or computing device signature with access credentials maintained in the secure storage region.

In some implementations, the access manager 152 provides (164) the user credentials to the user device 154. The user credentials, for example, may be embedded in a message header.

Using the user credentials, in some implementations, the user device 154 requests (166) a visualization from an analytics reports system 156. The analytics reports system 156, for example, may be one of a number of systems available to the user device 154 upon initial login with the access manager 152. For example, the access manager 152 may gate initial access rights to both the analytics reports system 156 of FIG. 1B and the CMS 106 of FIG. 1A. The visualization request, for example, may be similar to the visualization request submitted in step 126 of FIG. 1A. The visualization request (166), for example, may include at least a portion of the access credentials supplied by the access manager 152. For example, the access credentials may be added into the visualization request as a security token, similar to security ticket provided to the user device 102 in step 136 of FIG. 1A. For example, as discussed in relation to FIG. 1A, a security token may be embedded in a URL constructed for the user by the analytics reports system 156 (step not illustrated).

In some implementations, upon receiving the visualization request (166), the analytics reports system 156 extracts (168) the security token to obtain the user credentials. For example, the security token may be extracted from the header of the message, or a URL of a link.

In some implementations, the analytics reports system 156 determines (170) whether the user credentials match a known user to the analytics reports system 156. For example, a user may be added to the top level access manager 152 without having been populated to additional systems within the platform or computing environment being access by the user. The analytics reports system 156 may cross-reference the access credentials with an analytics reports system (ARS) database 158. As illustrated, the analytics reports system 156 determines (170) that the access credentials do not match an existing user and, thus, the requestor is a new user to the analytics reports system 156.

In this circumstance, in some implementations, the analytics reports system 156 creates (172) user information matching the passed in user credentials. However, the user may be created with a default role that lacks access permissions to resources of the analytics reports system 156. The resources, in some examples, may be domains and data sources available to fully registered users of the analytics reports system 156. If, instead, the user credentials from step 164 contained user role information, the role information may be populated by the analytics reports system 156 during user detail creation (172).

In some implementations, the analytics reports system 156 synchronizes (174) the new user information with the analytics reports system database 158. The user, for example, may be added to the database for subsequent look-up when fulfilling requests from the user of the computing device 154. The analytics reports system (ARS) database 158, in some embodiments, contains user information shared with additional systems within the platform being accessed by the user of the computing device 154.

The analytics reports system 156, in some implementations, provides (176) the requested visualization to the user of the computing device 154. As discussed in relation to FIG. 1A, the visualization may be provided via an access URL allowing the user of the computing device 154 to obtain information from the analytics reports system 156 (e.g., see step 136 of FIG. 1A). The access URL may include access credentials matching the information synchronized to the ARS database 158. If the user was added with a default role, in some embodiments, the requested visualization will be a default visualization presented to users who are not authorized to access the resources available via the analytics reports system 156.

In some implementations, the computing device 154 presents (178) the visualization to the user. As discussed in relation to FIG. 1A, presenting the visualization may include following a URL supplied by the analytics reports system 156 to obtain resources managed by the ARS database 158 and loading the resources for review by the user (e.g., see steps 144 and 146 of FIG. 1A).

At this point, the computing device 154 may continue to embed the user credentials in further requests (such as the request 166) to the analytics reports system.

In some embodiments, rather than incorporating the content management system and the content development system into a single environment for coordinated security key communication on behalf of the end user 104, a content management system may access the content development system via a plug-in utility. For example, a content management system such as the CMS 106 may interface with the content development system 108 using an application programming interface (API). In this version, turning to the example of FIG. 1A, the API or other plug-in interface may receive communications from the external CMS and perform operations as described in relation to steps 122, 128, 130, 132, 140, and 142.

Figure 2:
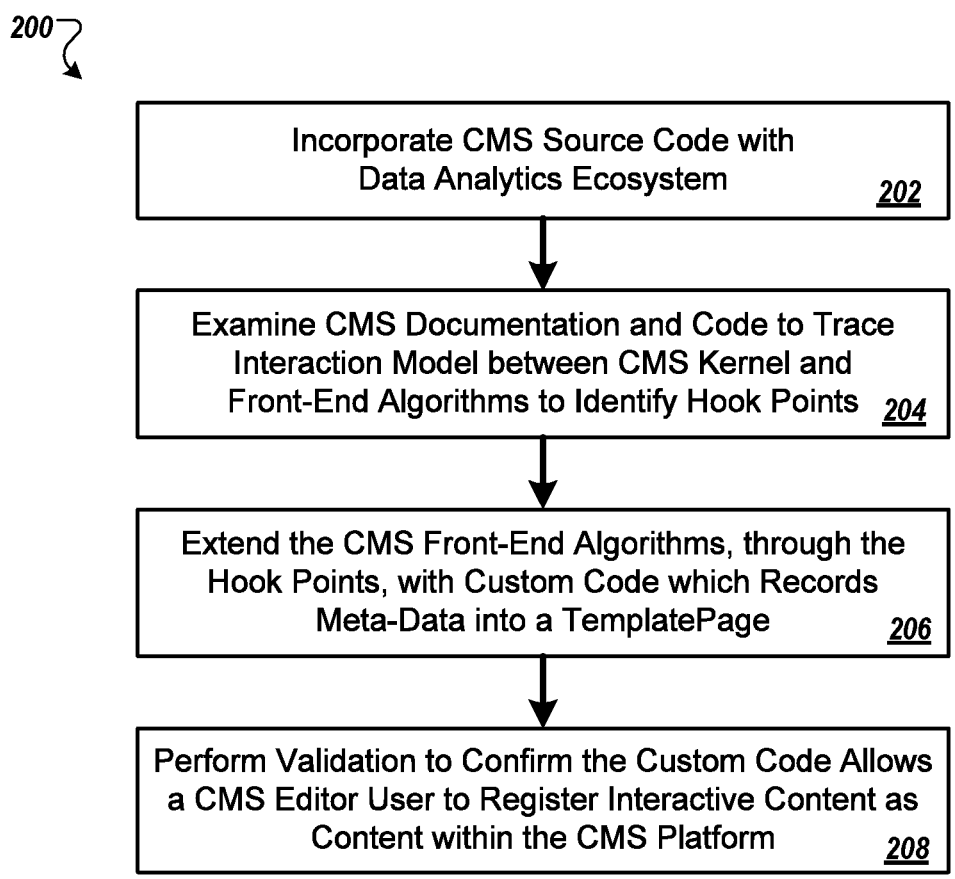
FIG. 2 is a flow chart of an example method for developing support for securely embedded dashboards within a content management system.

Turning to FIG. 2, a flow chart illustrates an example method 200 for developing support for securely embedded dashboards within a content management system integrated with a data analytics ecosystem.

In some implementations, the method begins with downloading CMS source code and committing the source code to a data analytics platform repository (202). Appropriate builds steps may be added into the data analytics ecosystem to bundle the application with the ecosystem. For example, the CMS may be configured to interface with a database server for presenting queries to gather analytics data for combination with web content. In another example, the CMS may be configured to interface with a cloud computing service to scalably execute functionality. Further, the CMS may be configured to access storage devices such as a web-based storage infrastructure. Each system interface configuration may include authentication information such that the CMS may authenticate its access with other systems in the analytics ecosystem.

In another illustration, the CMS may interface with systems and/or services through API integration. The CMS, for example, may be designed to interface, through APIs, with custom web parts and widgets, custom modules, and/or custom providers. Custom web parts and widgets, for example, can be developed to expand upon the CMS-provided content by supplying customized web functionality, such as content editing functionality, graphical user interface layout functionality, and/or interactive control functionality. Custom modules allow extension of additional aspects of the system, such as, in some examples, custom data objects and/or database tables, custom event handlers, and custom administrative interfaces. Custom providers may override built in service functionality, for example by shifting the functionality to a third party supplier. This can include information providers, data providers, email providers, search providers, and/or file system providers. Further, custom providers can include security authentication providers, payment providers, or other gateway services integrated into the CMS environment.

The CMS source code may be bundled into a continuous integration server, for example, to enable nesting of the CMS system within the data analytics ecosystem. A continuous integration server supports active merging of analytics developer product into the mainline analytics ecosystem functionality. This allows for automation of updates without disruption in analytics services supplied by the analytics ecosystem. The CMS, for example, may support synchronization and source control of integrated content to maintain consistency and data integrity. To ensure functionality, the entire CMS system may be bundled into the source control of the continuous integration server.

In some embodiments, CMS documentation and codebase are examined to trace the interaction model between the CMS kernel and its front-end (e.g., web) application (204). Hook points in CMS software are identified to customize the interaction model behavior for interoperability with other components of the data analytics ecosystem. The hook points, for example, allow for overriding default behavior and redirecting portions of the CMS functionality to additional systems within the analytics ecosystem. As illustrated above, the hook points can be used to override default page generation behavior, redirecting a portion of the content provision to a content development system.

In some implementations, the CMS front-end algorithms are extended, through the hook points, with custom code to override default behavior (206). As described in relation to FIG. 1A, the hook points can be used to integrate custom code (e.g., a custom web part) which records meta-data related to the CMS user authentication process. In a particular example, responsive to a page load event, the template page generated by the CMS can be extended with a custom web part for meta-data recording.

The custom component may include an API to interface with a content development system, establishing a hook to allow a portion of the CMS-served content to be supplemented with content provided by the content development system. The API interface may be provided using HAL endpoints such that the custom web part of the template page can communicate rich information (e.g., user information, security authentication information, timestamping information, etc.) with the content development system in a stateless, black box manner.

Using the user permission look-up and security ticket as described in relation to FIG. 1A, the custom component extends the incumbent content management system behavior by securely embedding content development system-supplied dynamic interactive user dashboard content. For example, an end user cannot hijack and exploit data using a client side API due to the security ticket mechanism.

In some implementations, after developing and integrating a custom component with a hook point in the CMS software, validation is performed to confirm the custom component allows a CMS editor user (e.g., analytics developer) to register dynamic interactive content, such as dynamic interactive dashboards, as content within the data analytics ecosystem (208).

At this point, the custom template page acts as a "blank canvas", allowing any new content to be automatically added to the system without the need for IT intervention. Multiple custom template pages may be designed for particular use scenarios. For example, a custom template page may be developed that collects snapshots of analytics presentations as the user navigates the dynamic interactive content.

In some implementations, the dynamic interact content includes a dashboard feature for capturing screen shots of analytics dashboard presentations and downloading the screen shots as a report document. For example, screen shots may be collected as a user navigates dashboard interfaces via a menu system dynamically portrayed within the dashboard interface. A flow chart of an example method 500 for capturing screen shots of analytics displays via a dynamically rendered menu system is presented in FIG. 5.

Figure 5:
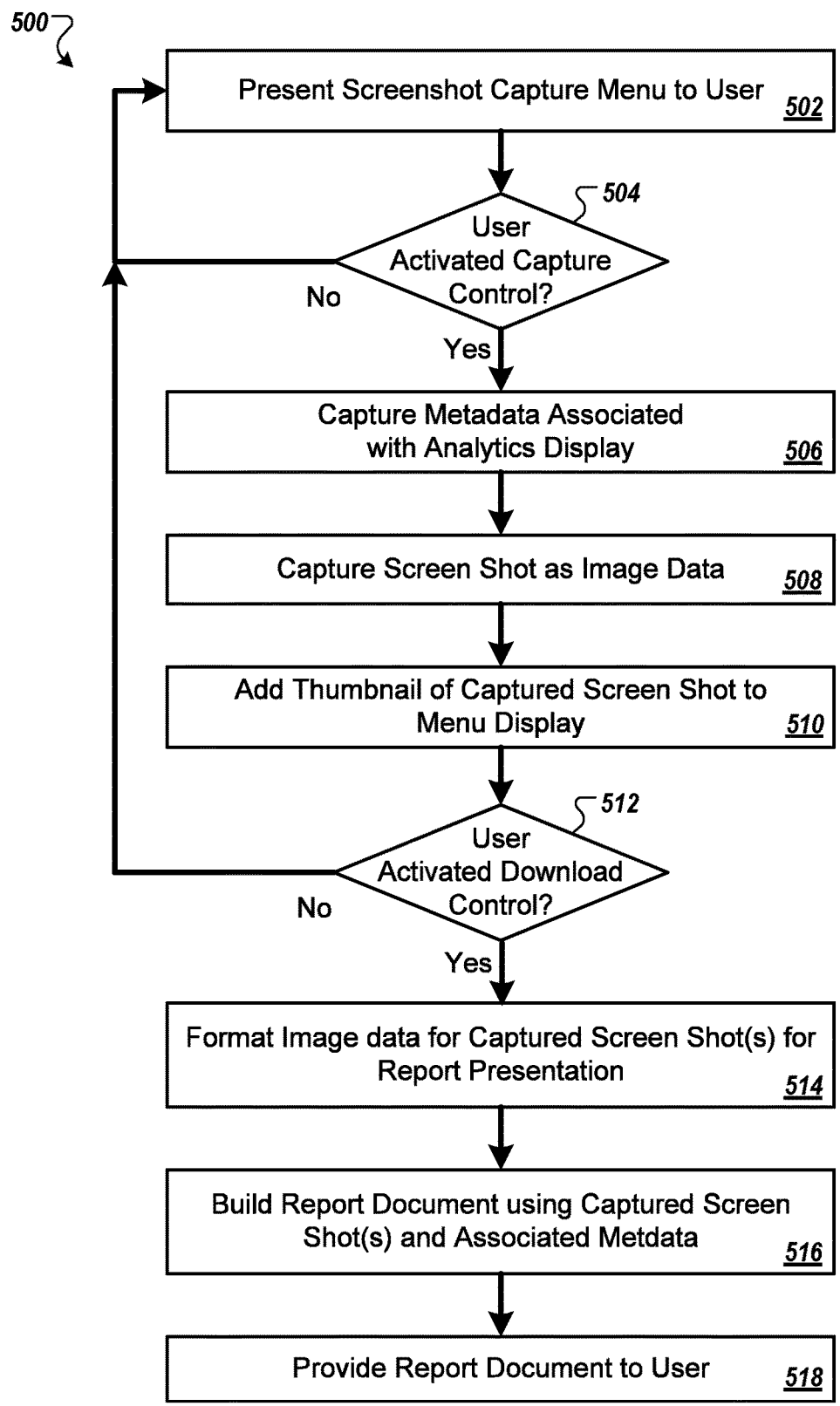
FIG. 5 is a flow chart of an example method for providing a screen shot capture feature in a dashboard environment.

Turning to FIG. 5, in some implementations, a screenshot capture menu is presented to a user (502). As illustrated in a user dashboard window 300 of FIG. 3, for example, a custom template may be designed to provide a menu option, such as the menu 302, linking a screen shot collection feature to the dashboard interface such that, as the user navigates, the user can selectively collect screen shots of dashboard interfaces and later export the screen shots. The menu 302 may be configured to stow to the side of the user dashboard window 300, drop down from a menu, or otherwise remain hidden until the user identifies an analytics interface for addition to the slideshow or other export document.

The screen shot collection feature, in some implementations, executes as a runtime executable application such as a cascading style sheet (CSS) application designed to access presently presented image information, convert it to a downloadable file format, and use it in generating a report. In another example, the screen shot collection features may execute as an interpreted programming interface such as a JavaScript interface. In a particular example, the screen shot collection feature may use the D3 JavaScript library features for converting the presented analytics dashboard to an image format suitable for download as a presentation file.

In some implementations, a user actuates a control (504) to activate screenshot capture. For example, a user may select a control 308 of FIG. 3 to collect a screenshot of the current dashboard interface. In some embodiments, a user may select, through a single control or menu option, to gather a series of screenshots during a browsing session (e.g., record the user's navigation history via screen shots).

In some embodiments, metadata associated with the present analytics display is captured (506). The screen shot collection feature, in some embodiments, obtains metadata values from the page template to apply as customized settings for image capture and/or presentation formatting. For presentation formatting, in one example, the metadata may include one or more settings applied by the user in obtaining the present analytics presentation, such as data filter selections. In another example, presentation formatting metadata values can include a header value for titling the screen shot within the generated presentation. For image capture, the metadata values may indicate style settings to apply in formatting the captured image data. In some embodiments, the metadata values indicate rules or options for execution of the runtime executable application. For example, the runtime executable application may include a number of branch paths optimized for different styles of analytics presentations. In a particular example, a first path may be optimized for complex shape processing, while a second path may be optimized to process text-intensive dashboard displays.

In some implementations, the current screen shot is captured as image data (508). In some embodiments, to enable capture of screen contents without access to image files or other files used to generate such contents, the screen shots may be captured by the screen shot collection feature in a vector image format such as a Scalable Vector Graphics (SVG) file. Vector image formatting, for example, allows for improved scalability of the image to fit upon a printed report. In other embodiments, the screen shot collection feature may capture the screen shots as raster graphics (e.g., bitmap). For example, the screen shot collection feature may collect the displayed information using the Canvas element of HTML5. Canvas, functioning with raster graphics, may be less preferable for dashboard interfaces involving complex shapes, such a geographic map presentations. However, if the dashboard interface is directly accessible as HTML code, Canvas may be faster and simpler to execute. In further embodiments, the screen shot collection feature may transform the vector graphics file to a file compatible with the Canvas element of HTML5 for additional processing.

For example, Canvas may be used to merge the collected dashboard interface image with additional elements included for the report, such as a representation of the filter values applied by the user and/or the header information accessed from the metadata content of the dashboard interface.

While collecting screen shots, in some implementations, the screen shot collection feature stores the downloaded image data and metadata values in session storage accessible to a web browser used to access the dashboard interface. In other implementations, the screen shot collection feature transfers the image data to remote storage for further processing. For example, the screen shot collection feature may interface with a cloud-based application for manipulation and packaging of the analytics dashboard image data.

Figure 3:
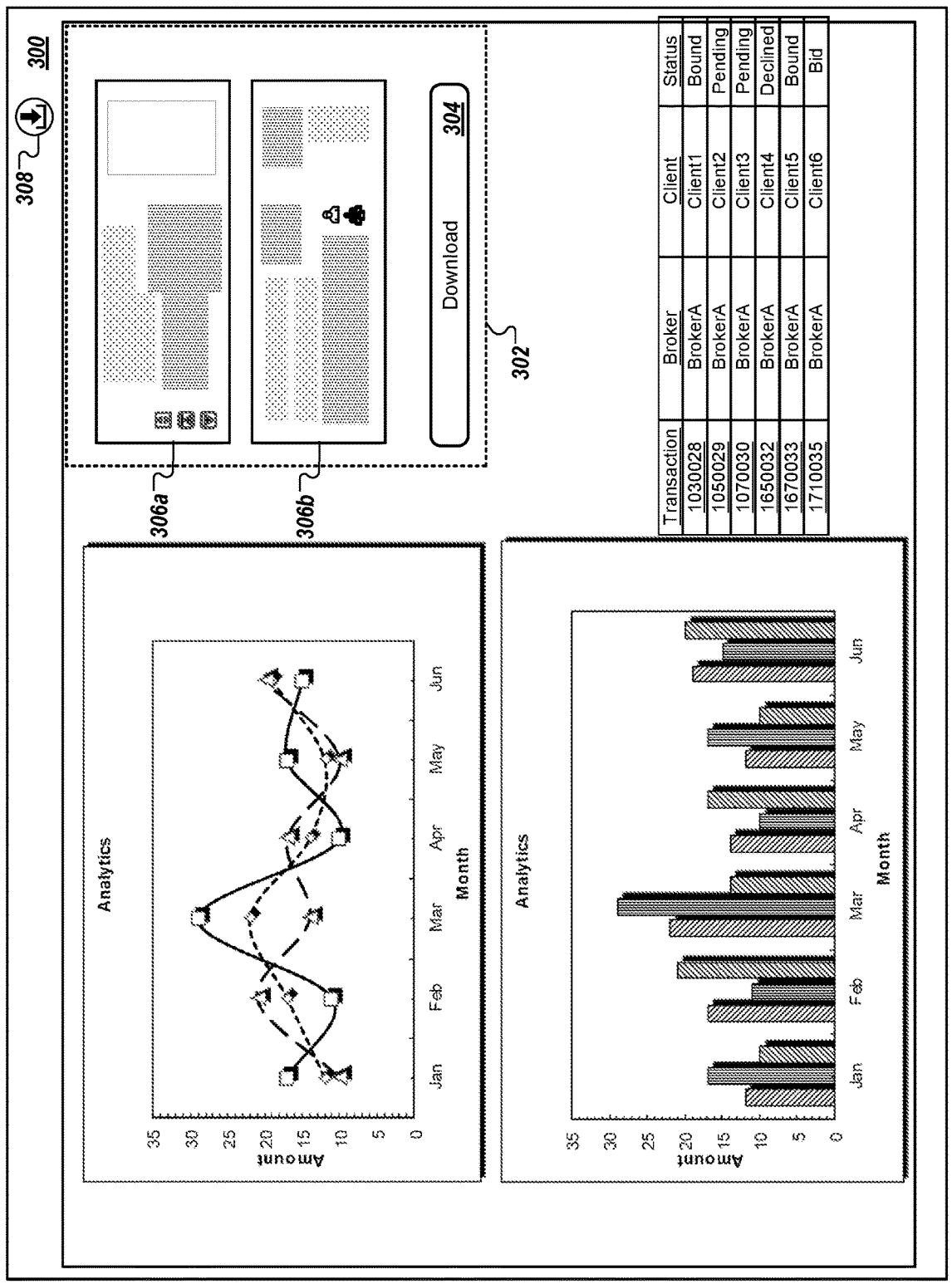
FIG. 3 is an example custom template for providing a menu for collecting screen shots during user navigation.

In some implementations, the screen shot collection feature presents thumbnail images of collected screen shots (510), such as the thumbnail images 306 of FIG. 3. As shown in the menu 302, the user may be presented with thumbnail images 306*a*, 306*b* of analytics visualizations already captured through the screen capture mechanism provided within the menu 302. The thumbnail images 306, for example, may be rendered as an HTML-based image, such as a resized image of the original HTML presentation.

In some implementations, upon selection of the download control 304 (512), the image data (and, optionally, presentation settings derived through dashboard interface metadata) collected by the screen shot collection feature is converted into a report format (514). The image data, for example, may be provided to a report generating API for conversion into a report format. In some embodiments, a number of report generating APIs may be available, each being customized to handle a particular style of dashboard interface. As described above in relation to image download, one report generating API may be optimized to handle complex shapes (e.g., maps), while another report generating API may be optimized to handle sizing and reformatting of text information for legibility in a printed report.

In some implementations, the screen shot collection feature or report generating API determines resizing and placement of each screenshot. For example, the screen shot collection feature or report generating API may detect an image data size and transform the image data for landscape presentation and/or printing upon standard printer paper (e.g., letter, legal, A4, etc.). In transforming the image, the screen shot collection feature or report generating API may factor in legibility of text-based contents (e.g., maintain any text at 6-point font or greater).

In some implementations, a report document is built using the captured screen shot(s) and associated metadata (516). Different report generating APIs may be provided based upon report format. In some examples, reports may be generated as a slide presentation such as Microsoft Power-Point (PPT) format or as a document such as Adobe Portable Document Format (PDF) or Microsoft Office document format. The download control 304, when activated, may present download formatting options to the user via the dashboard interface.

In some implementations, the image data is formatted for inclusion in a basic report template, such as a basic PPT template file. In other implementations, the screen shot collection feature or report generating API accesses a template file specific to the user (e.g., formatted with entity name, logo, etc. associated with the user of the dashboard interface). In further embodiments, the screen shot collection feature presents multiple options for report templates available for selection by the user. For example, the download control 304, when activated, may present report template options to the user via the dashboard interface.

In some implementations, the screen shot collection feature or report generating API collects additional information for inclusion within the report file. For example, the screen shot collection feature or report generating API may capture a current timestamp and apply the date (and optionally time) to the report file. Further, the screen shot collection feature or report generating API may access user-specific information such as entity name, entity logo, user name, user department, etc. for inclusion in a title page, header, footer, etc. of the report file.

In some implementations, the report document is provided to the user (518). The screen shot collection feature or report generating API, in some implementations, creates the report file for the user in real time. For example, upon activation of the download control 304, the screen shot collection feature may initiate report preparation and, in near-real-time, supply the report file to the user via the browser interface. For example, a file download feature of the browser used for accessing the dashboard interface may be used to supply the report file to the user. In other embodiments, the report file may be emailed to the user upon completion of preparation or stored within the user's account information for later access via the dashboard interface.

Figure 4:
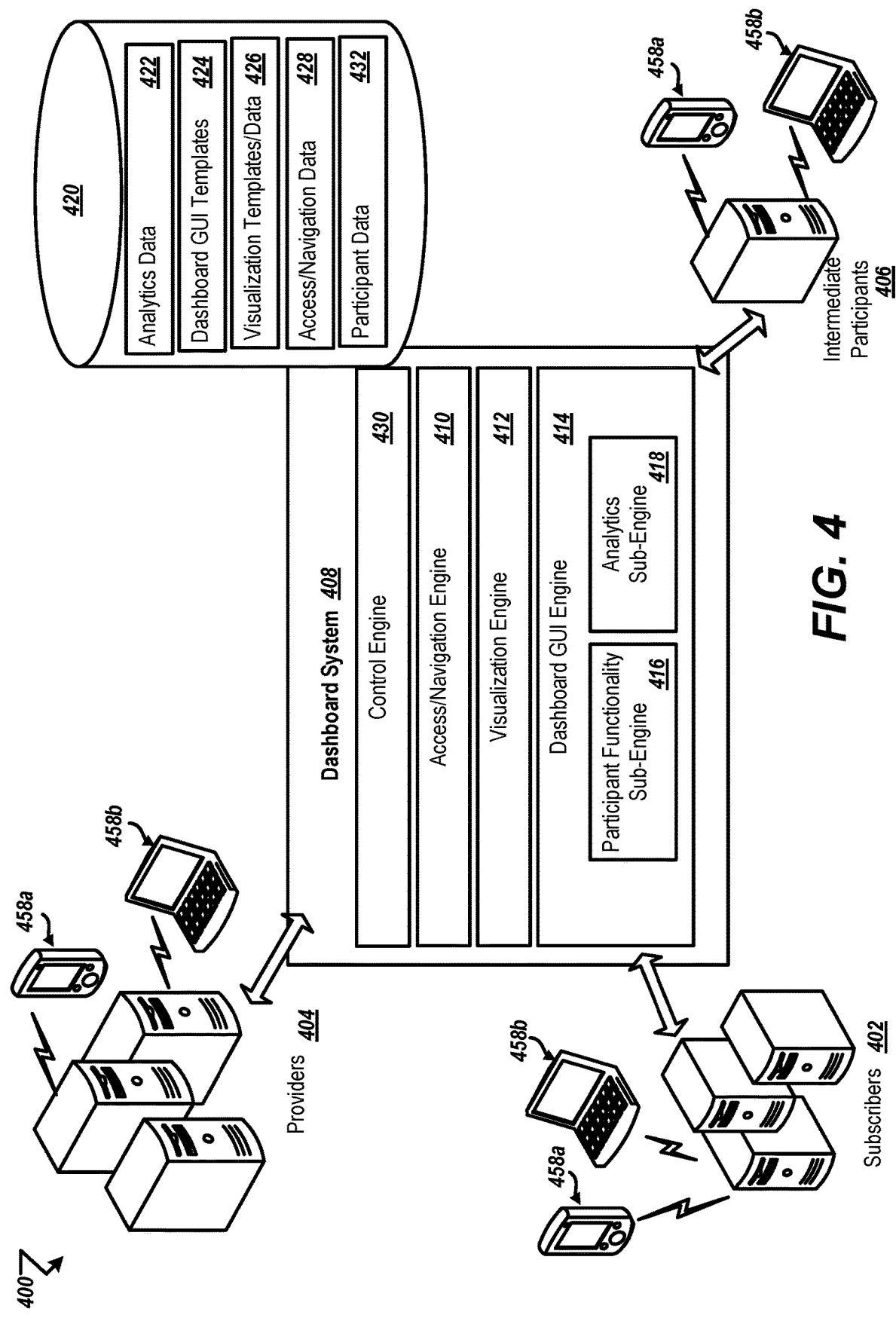
FIG. 4 is a diagram of an example environment for a dashboard system.

FIG. 4 is a diagram of an example environment 400 for a dashboard system 408 that implements the processes described previously herein. The diagram illustrates external users of the dashboard system 408 (e.g., subscribers 402, providers 404, and intermediate participants 406). The providers 404 can include the industry participants such as insurance and/or reinsurance providers, the subscribers 402 include one or more subscribers 402 that receive products and/or services from the providers 404 such as insurance protection, and the intermediate participants 406 may manage interactions between the subscribers 402 and providers 404 such as brokers or coordinators. In some implementations, the dashboard system 408 manages processing of participant requests in order to present the dashboard interfaces to the participants in real-time in response to receiving a request from the participant. For example, the dashboard system 408 may control how cloud computing resources are allocated within a multi-tiered cloud computing environment in order to increase processing efficiency and speed of execution. At least a portion of the dashboard system 408 may be implemented by a content management system such as the CMS 106 described in relation to FIG. 1A

The subscribers 402, providers 404, and intermediate participants 406 include a number of computing devices and databases distributed across a widely dispersed network that may be distributed across a large, international geographic area. Networks for each of the subscribers 402, providers 404, and intermediate participants 406 can be separate and independent from any network associated with any other participant in the dashboard environment 400. In addition, the data handled and stored by each of the subscribers 402, providers 404, and intermediate participants 406 may be in a different format than the data handled and stored by the other participants of in the dashboard environment 400. The subscribers 402, providers 404, and intermediate participants 406 provide inputs to the dashboard system 408 that may include requests to access the dashboard system 108 to view analytics information through dashboards that are customized to a user profile for each of the participants. The data provided to the dashboard system 408 from each of the participants may be independent from the other participants and in a different format than the data provided by the intermediate participants 406 and providers 404.

The dashboard system 408 includes engines or applications that perform processes associated with aggregating transactional data and generating transaction metrics for display to the subscribers 402, providers 404, and intermediate participants 406 via a dashboard interface on a computing device. References to the engines or modules throughout the disclosure are meant to refer to software processes executed by circuitry of one or more processing circuits, which can also be referred to interchangeably as processing circuitry. In some implementations, the processes associated with the engines of the dashboard system 408 are performed by one or more cloud-computing resources in the cloud computing environment. In addition, the processes performed by the engines of the dashboard system 408 can be executed in real-time in order to provide an immediate response to a system input. The processes can also be performed automatically in response to a process trigger that can include the reception of data from a data repository, a participant, or another processing engine.

The dashboard system 408, in some embodiments, includes a control engine 430 that provides high-level control of interactions between the subscribers 402, providers 404, and intermediate participants 406 and computing resources associated with the other processing engines of the dashboard system 408. For example, when a participant request to view a dashboard is received, the control engine 430 may parse the request into one or more processing tasks that are distributed among the computing resources of the dashboard system 408. As discussed in further detail herein, the dashboard system 408 can be implemented in a cloud computing environment that has computing resources distributed across one or more availability zones (AZs) within a geographical region. When a request to access a dashboard interface is received from a participant, the control engine 430 may determine which AZ to route the associated processing tasks to based on availability of the computing resources within the AZs and current processing demands on the computing resources. The control engine 430 may also control allocation of the one or more processing tasks associated with the request to the computing resources within the AZs.

The dashboard system 408, in some embodiments, includes an access/navigation engine 410 that provides a portal for the participants to access to the dashboard system 408, such as through a web browser. In some implementations, the access/navigation engine 430 uses a role based access control (RBAC) model to determine what types of dashboards and data a particular participant can access. The access/navigation engine 430 may control generation of a user profile for each of the participants, which is used to populate a RBAC table for the participant, which is stored as access/navigation data 428 in data repository 420 (e.g., such as the CMS user store 110 of FIG. 1A). For example, a RBAC table entry for a given provider 404 can indicate permissions for the provider 404 to access a particular insurance carrier relevant dashboard interfaces, as well as a customized dashboard for the provider 404 that displays custom data tailored to the specific provider 404. In response to receiving a participant log-in request to access the dashboard interfaces, the access/navigation engine 410 may validate authentication information input by the participant and control the information and dashboard interfaces that are accessible to the participant via a web interface based on the validated authentication information. The access/navigation engine 410, for example, may restrict access by retrieving content relevant to the RBAC permissions, such as a dashboard template designed for presentation to a user of a particular role.

In some embodiments, the dashboard system 408 includes a visualization engine 412 that generates graphics and visual tools associated with the transactional data and metrics that are displayed on the dashboard interfaces. The visualization engine 412 may generate various types of plots, graphs, etc. that can be determined based on the type data being displayed to the user via the dashboard interface screens or visualization preferences of the user requesting the information presented on the dashboard interface. For example, the dashboard interface of FIG. 3 illustrates an example data presentation. The visualization engine 412 may also determine color schemes, visual contrast, and other visual attributes of the graphical representation displayed on the dashboard interfaces based on a size of the graphical representation, other graphical representations included in dashboard interface, etc. In one example, the visualization engine 412 is provided in party by the content development system 108 of FIG. 1A.

The dashboard system 408, in some implementations, also includes a dashboard graphical user interface (GUI) engine 414 that controls dissemination and reception of data from the subscribers 402, providers 404, and intermediate participants 406 through one or more dashboard GUI screens that are output to the external devices 458. In some implementations, in response to detecting that an input field of a dashboard interface has been filled or a submission control has been clicked, the dashboard GUI engine 414 extracts the data input by the user at the dashboard interface and stores the data in the data repository 420 or passes the data to another processing engine of the dashboard system 408. For example, the dashboard GUI engine 414 receives the transaction data parameters input by the intermediate participants 406 at a dashboard interface and stores the transaction data parameters for each of the intermediate participants 406 as participant data 432 in the data repository 420. In some implementations, the participant data 432 can be stored with the access/navigation data 428 in the data repository 420. The dashboard GUI engine 414 also controls the dissemination of information on the dashboard interfaces requested by the subscribers 402, providers 404, and intermediate participants 406. For example, in response to receiving a request for a dashboard interface from a participant, the dashboard GUI engine 414 may access applicable analytics data 422 from the data repository 420 associated with the requested information based on the access/navigation data 428 for the participant determined by the access/navigation engine 410, and determine statistics or metrics associated with the request. In some implementations, the dashboard GUI engine 414 passes the determined statistics or metrics to the visualization engine 412, which are used to generate the graphical representations of the statistics or metrics. The dashboard GUI engine may receive the generated graphical representations from the visualization engine 412, and output the generated graphical representations along with any other applicable data to the computing device 458 of the participant on the requested dashboard interface. The dashboard GUI engine 414 may include components of the CMS 106 of FIG. 1A and/or the content development system 108 of FIG. 1A.

The dashboard GUI engine 414, in some embodiments, includes one or more sub-engines, which are accessed directly by the dashboard GUI engine 414 in a web browser that is displayed to the participant. For example, a participant functionality engine 416 provides specific dashboard functionality for each type of participant (e.g., subscriber 402, provider 404, and intermediate participant 3606) as well as user-specific dashboard functionality as indicated in a user profile. In some implementations, the participant functionality engine 416 determines the dashboard functionality for a particular participant based on the access/navigation data 428 and participant data 432 stored in the data repository 420. In response to receiving a request to view the portal, the participant functionality engine 416 determines what type of data is displayed in the various sections of the portal based on the data that is accessible by the participant and preferences indicated by the participant. In some examples, the participant can indicate preferred news websites, social media platforms, etc. For example, the subscribers 402, providers 404, and intermediate participants 406 may have different priorities related to what type of data is displayed in sections of the portal.

Another example of a sub-engine associated with the dashboard GUI engine 414 is an analytics sub-engine 418 that provides, in some embodiments, specific analytic functionality to the participants interacting with the dashboard system 408. The analytics sub-engine 418 may execute one or more software processes associated with calculating any of the metrics or statistics displayed on the dashboard interfaces described herein.

In some implementations, data associated with the processes performed by the dashboard system 408 is stored in one or more data repositories of the dashboard environment 400, such as data repository 420. Data received by the dashboard system 408 from the one or more data sources can be received and stored in real-time with respect to when the data is received from various data sources. In addition, the data can be stored automatically in response to receiving one or more data files from the data sources. In some implementations, the data stored in the data repository 420 can include analytics data 422, dashboard GUI templates 424, visualization templates/data 426, access/navigation data 428, and participant data 432.

The analytics data 422 stored in the data repository 420, in some implementations, is processed by the analytics sub-engine 418 to produce the graphical display of the transactional data and metrics based on a type of dashboard requested by the participant. In some implementations, the analytics data 422 can include data from one or more data sources that are used to generate the statistics and metrics displayed on the dashboard interfaces. For example, the analytics data 422 can include insurance market data received from public data sources as well as transactional data associated with each of the participants received from the computing devices 458 of the subscribers 402, providers 404, and intermediate participants 406.

The data repository 420, in some implementations, also stores dashboard GUI templates 424 that are accessed by the dashboard GUI engine 414 to generate one or more dashboard interfaces to output to the external devices 458 to interface with the participants in the dashboard environment 400. In some implementations, the dashboard GUI templates 424 include one or more stored software processes and data files associated with generating the requested dashboard interfaces that are displayed on the computing devices 458 of the participants.

The data repository 420, in some implementations, also stores visualization templates/data 426 that are used by the visualization engine 412 to produce the various visual representations of the transactional data and metrics displayed on the dashboard interfaces that are output to the external devices 458 of the participants. In some implementations, the visualization templates/data 426 include one or more stored software processes and data files associated with producing the various graphs, plots, and other graphical representations displayed on the requested dashboard interfaces.

The data repository 420, in some implementations, also stores access/navigation data 428 that is accessed by the access/navigation engine 420 to control the types of data and dashboards that the participants have access to. In some implementations, the access/navigation data 428 can include lists of registered participants and corresponding permissions for the participants, along with configuration information controlling how data is handled and passed between computing resources in the cloud computing environment based on the access permissions for the participant. For example, the access/navigation data 428 can include RBAC tables that indicate the access permissions associated with specific participants. The access/navigation data 428 may also include web state information used to synchronize state and caches across servers of the access/navigation engine 410.

In some embodiments, data repository 420 also stores the participant data 432 that is extracted by the dashboard GUI engine 414 from one or more input dashboard interfaces where the participants (e.g., subscribers 402, providers 404, and intermediate participants 406) input transaction data parameters (e.g. FIG. 9), visualization preferences, data type preferences, and any other information that describes the participant. For example, the participant data 432 can include preferences of participants related to types of data the participant wishes to see displayed in the various sections of the portal, such as an industry risk news section. In some implementations, the participants can input preferences, which can be stored in the data repository 420 as participant data 432. In some implementations, the participant data 432 can be combined with the access/navigation data 428 for a particular participant.

Figure 6:
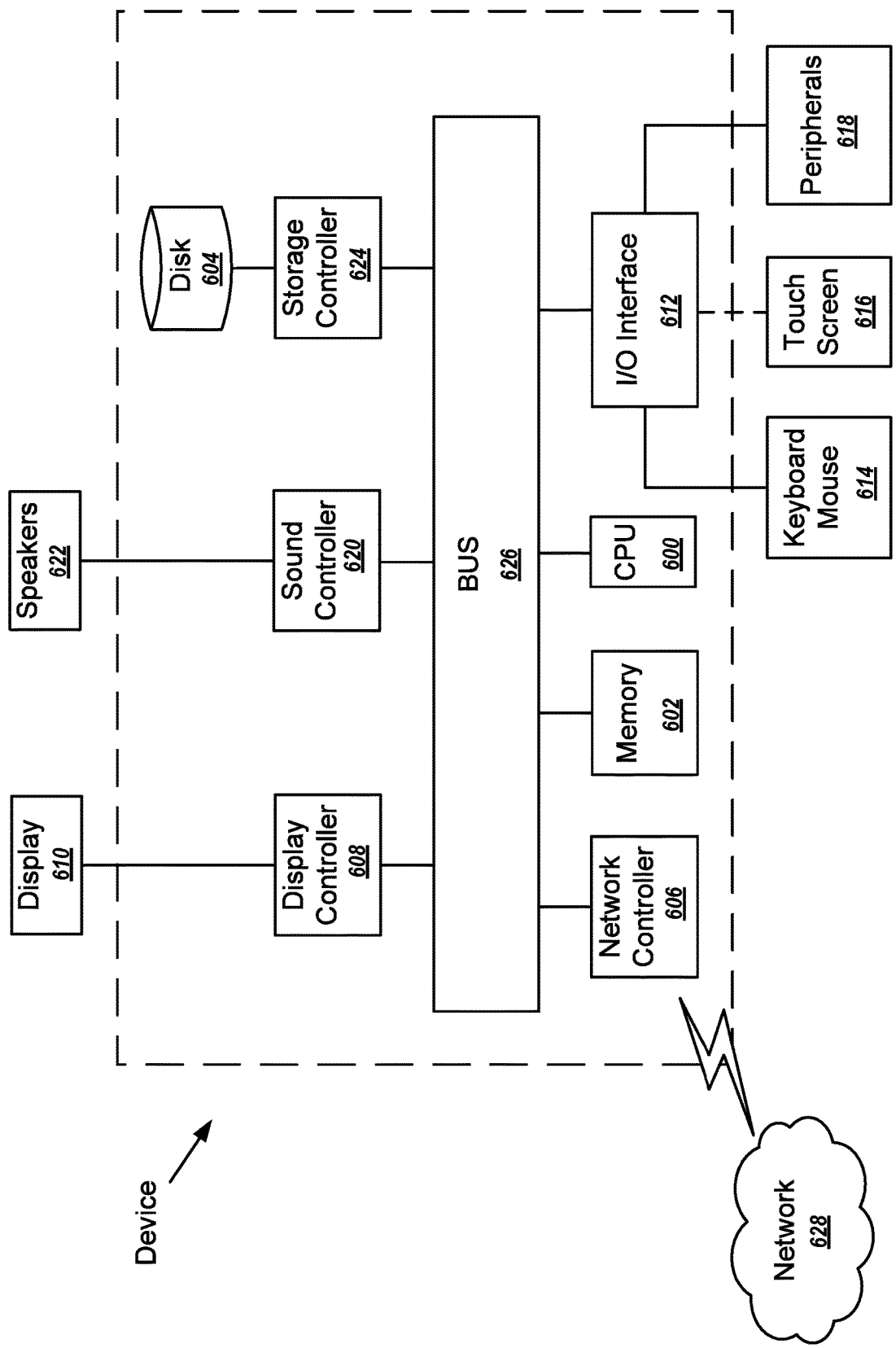
FIG. 6 is a block diagram of an example computing system.

Next, a hardware description of the computing device, mobile computing device, or server according to exemplary embodiments is described with reference to FIG. 6. In FIG. 6, the computing device, mobile computing device, or server includes a CPU 600 which performs the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 600 and an operating system such as Microsoft Windows 6, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The computing device, mobile computing device, or server in FIG. 6 also includes a network controller 606, such as an Intel Ethernet PRO network interface card from Intel Corporation of America, for interfacing with network 628. As can be appreciated, the network 628 can be a public network, such as the Internet, or a private network such as an LAN or WAN network, or any combination thereof and can also include PSTN or ISDN sub-networks. The network 628 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device, mobile computing device, or server, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device, mobile computing device, or server. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 7:
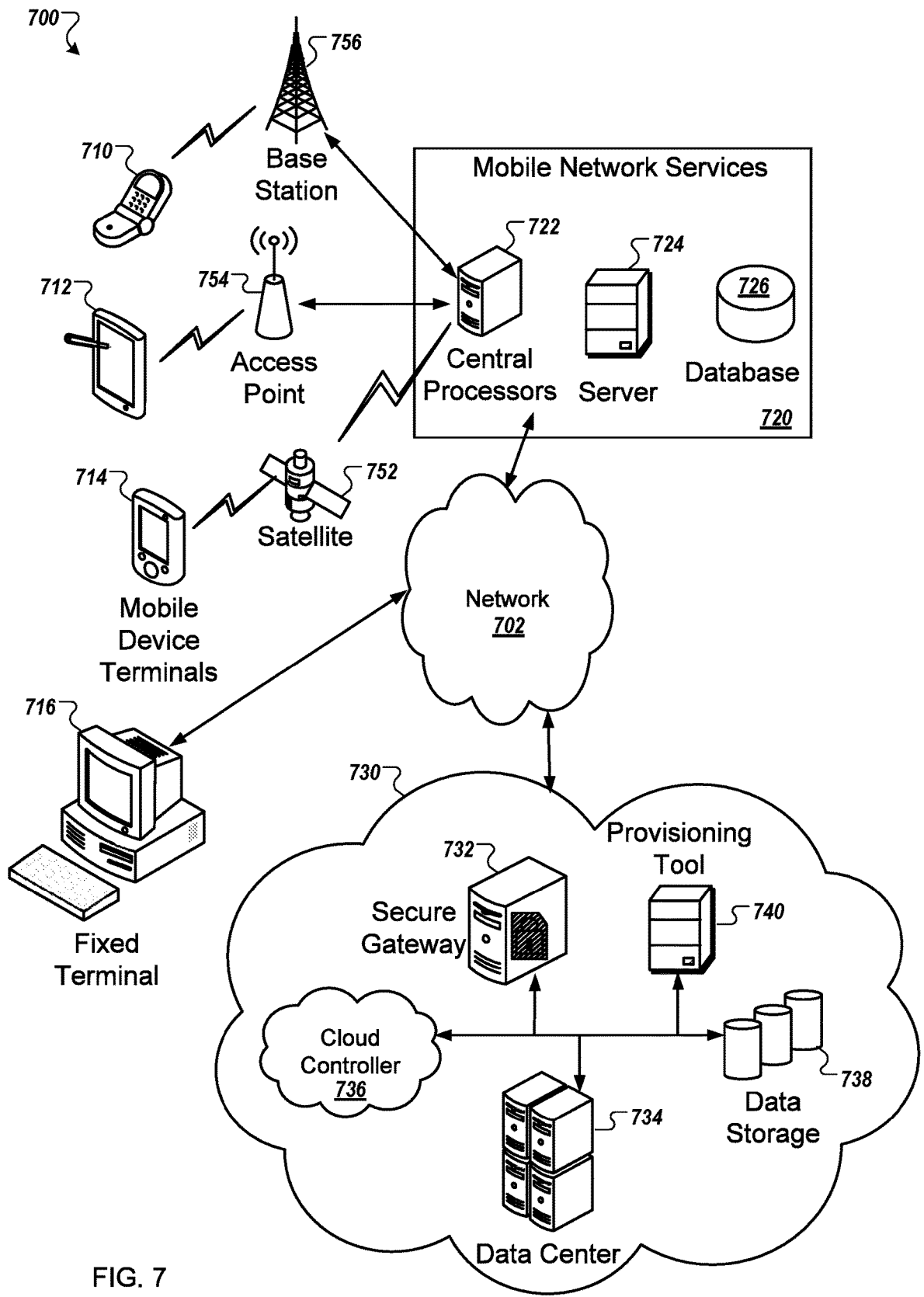
FIG. 7 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 7, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 730, such as Google Cloud Platform™ to perform at least portions of methods or algorithms detailed above. The processes associated with the methods described herein can be executed on a computation processor, such as the Google Compute Engine by data center 734. The data center 734, for example, can also include an application processor, such as the Google App Engine, that can be used as the interface with the systems described herein to receive data and output corresponding information. The cloud computing environment 730 may also include one or more databases 738 or other data storage, such as cloud storage and a query database. In some implementations, the cloud storage database 738, such as the Google Cloud Storage, may store processed and unprocessed data supplied by systems described herein.

The systems described herein may communicate with the cloud computing environment 730 through a secure gateway 732. In some implementations, the secure gateway 732 includes a database querying interface, such as the Google BigQuery platform.

The cloud computing environment 102 may include a provisioning tool 740 for resource management. The provisioning tool 740 may be connected to the computing devices of a data center 734 to facilitate the provision of computing resources of the data center 734. The provisioning tool 740 may receive a request for a computing resource via the secure gateway 732 or a cloud controller 736. The provisioning tool 740 may facilitate a connection to a particular computing device of the data center 734.

A network 702 represents one or more networks, such as the Internet, connecting the cloud environment 730 to a number of client devices such as, in some examples, a cellular telephone 710, a tablet computer 712, a mobile computing device 714, and a desktop computing device 716. The network 702 can also communicate via wireless networks using a variety of mobile network services 720 such as Wi-Fi, Bluetooth, cellular networks including EDGE, 3G and 8G wireless cellular systems, or any other wireless form of communication that is known. In some embodiments, the network 702 is agnostic to local interfaces and networks associated with the client devices to allow for integration of the local interfaces and networks configured to perform the processes described herein.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for secure authentication within a data analytics environment, comprising:
   receiving, from a computing device via a network, a request for access to one or more visualizations within a data analytics platform on behalf of a user,
      wherein the request is received at a first interface connecting a content management subsystem to the computing device, and
      wherein the one or more visualizations include coded web features with at least one of data source information, calculations, metadata, or data field information from one or more third-party sources;
      retrieving, by processing security from a content development subsystem via a second interface connecting the content management subsystem to the content development subsystem, a security ticket for accessing the one or more visualizations for presentation to the user;
   embedding, by the processing circuitry, the security ticket in a resource identifier used for accessing the one or more visualizations;
   providing, by the processing circuitry via the first interface and the network, the resource identifier to the computing device;
   identifying, by the processing circuitry at the first interface, an access attempt by the computing device using the resource identifier;
   receiving, by the processing circuitry, a validation of the security ticket from the content development subsystem; and
   responsive to receiving the validation, returning, to the computing device at the first interface via the network, information for generating at least a first visualization of the one or more visualizations, wherein returning the information includes returning a uniform resource locator or uniform resource identifier for providing an access link to at least the first visualization from the content development subsystem via a third interface connecting the computing device and the content development subsystem;
   wherein the first interface, the second interface, and the third interface are each different interfaces;
   wherein the computing device is separate from the content management subsystem; and
   wherein the content development subsystem is separate from the content management subsystem.

2. The method of claim 1, wherein:
the request comprises user identification information; and
the method further comprises confirming, using the user identification information,
permissions of the user to access the one or more visualizations.

3. The method of claim 1, wherein the security ticket is valid for a single access to data analytics content.

4. The method of claim 1, further comprising, prior to receiving the request, authenticating the user by confirming a user role associated with the user, wherein the one or more visualizations are relevant to the user role.

5. The method of claim 1, wherein, upon using the information for generating the first visualization, subsequent interactions of the user within the first visualization are enabled by the content development subsystem without participation of the content management subsystem.

6. A non-transitory computer readable medium having instructions stored thereon, wherein the instructions, when executed by processing circuitry, cause the processing circuitry to:
   receive, from a requesting computing system at a first interface, a request for access to a visualization on behalf of a user,
      wherein the first interface connects a content management subsystem to the requesting computing system, and
      wherein the one or more visualizations include coded web features with at least one of data source information, calculations, metadata, or data field information from one or more third-party sources;
   retrieve, from a content development subsystem via a second interface connecting the content management subsystem to the content development subsystem, the security ticket for accessing the one or more visualizations;
   embed, within a resource identifier used for accessing the one or more visualizations, the security ticket;
   provide, via the first interface via the network, the resource identifier to the requesting computing system;
   identify, at the first interface, an access attempt by a user computing system using a resource identifier embedded with the security ticket;
   validate the security ticket with the content development subsystem; and
   return, to the user computing system via the first interface responsive to the validating, information for generating at least a first visualization of the one or more visualizations, wherein
      returning the information includes returning a uniform resource locator or uniform resource identifier for providing an access link to at least the first visualization from the content development subsystem via a third interface connecting the computing device and the content development subsystem;
   wherein the requesting computing system is different than the user computing system;
   wherein the content management subsystem is different than the user computing system and the requesting computing system;

wherein the first interface, the second interface, and the third interface are each different interfaces; and wherein the content development subsystem is separate from the content management subsystem.

7. The non-transitory computer readable medium of claim 6, wherein the visualization comprises a visualization template provided by the content management subsystem and designed to support content supplied by the content development subsystem, wherein hooks provided within the visualization template provide metadata for use by the content development subsystem in supplying interactive, dynamic content.

8. A system for secure authentication within a data analytics environment, the system comprising:

a content management subsystem that provides access to secure content from a content development subsystem, the content management subsystem comprising a first interface for connecting the content management subsystem to a remote computing device of a user, a second interface for connecting the content management subsystem to the content development subsystem, and processing circuitry that receives, at the first interface, a request for access to one or more visualizations within a data analytics platform on behalf of the user from the remote computing device, wherein the one or more visualizations include coded web features with at least one of data source information, calculations, metadata, or data field information from one or more third-party sources, retrieves, from the content development subsystem via the second interface, a security ticket for accessing the one or more visualizations for presentation to the user, embeds, within a resource identifier used for accessing the one or more visualizations, the security ticket, provides, via the first interface, the resource identifier to the remote computing device via the network, identifies, at the first interface, an access attempt by the remote computing device using the resource identifier, and returns, responsive to receiving a validation of the security ticket from the content development subsystem, information for generating at least a first visualization of the one or more visualizations to the remote computing device via the first interface, wherein returning the information includes returning a uniform resource locator or uniform resource identifier for providing an access link to at least the first visualization from the content development subsystem via a third interface connecting the remote computing device and the content development subsystem;

wherein the first interface, the second interface, and the third interface are each different interfaces;

wherein the remote computing device is different than the content management subsystem; and wherein the content development subsystem is separate from the content management subsystem.

9. The system of claim 8, wherein the first interface is a web portal application accessed by the remote computing device.

10. The system of claim 9, wherein the web portal application provides a dashboard interface for presenting the one or more visualizations to the user at the remote computing device.

11. The system of claim 8, wherein the second interface is a custom template page including one or more APIs that each communicate with the content development subsystem.

12. The system of claim 11, wherein the one or more APIs of the custom template page include REST APIs.

13. The system of claim 11, wherein retrieving the security ticket from the content development subsystem comprises passing one or more items of authentication metadata for the user to the content development subsystem.

14. The system of claim 13, wherein each of the one or more items of authentication metadata is associated with a respective API of the one or more APIs.

15. The system of claim 8, wherein the security ticket is valid for only a single access to data analytics content.

* * * * *